US007010367B2

(12) United States Patent
Koch et al.

(10) Patent No.: US 7,010,367 B2
(45) Date of Patent: Mar. 7, 2006

(54) OPERATOR INTERFACE FOR A WORK MACHINE

(75) Inventors: Roger Dale Koch, Pekin, IL (US); Jeffrey Stephen Alig, Morton, IL (US)

(73) Assignee: Caterpillar Inc., Peoria, IL (US)

(*) Notice: Subject to any disclaimer, the term of this patent is extended or adjusted under 35 U.S.C. 154(b) by 194 days.

(21) Appl. No.: 10/686,483

(22) Filed: Oct. 16, 2003

(65) Prior Publication Data

US 2005/0085929 A1 Apr. 21, 2005

(51) Int. Cl.
*G05B 15/00* (2006.01)

(52) U.S. Cl. ............................ 700/85; 700/83; 701/50

(58) Field of Classification Search .................. 700/83, 700/85; 37/264, 348; 701/50; 172/2; 180/324
See application file for complete search history.

(56) References Cited

U.S. PATENT DOCUMENTS

| | | | | |
|---|---|---|---|---|
| 4,574,651 | A * | 3/1986 | Nordstrom | 74/471 XY |
| 5,704,429 | A * | 1/1998 | Lee et al. | 172/4.5 |
| 5,740,053 | A | 4/1998 | Iwama | |
| 5,854,988 | A * | 12/1998 | Davidson et al. | 701/50 |
| 6,061,617 | A * | 5/2000 | Berger et al. | 701/50 |
| 6,169,948 | B1 * | 1/2001 | Fujishima et al. | 701/50 |
| 6,282,477 | B1 | 8/2001 | Gudat et al. | |
| 6,354,023 | B1 * | 3/2002 | Trahan et al. | 37/219 |
| 6,766,600 | B1 * | 7/2004 | Ogura et al. | 37/348 |
| 6,782,644 | B1 * | 8/2004 | Fujishima et al. | 37/348 |
| 6,826,465 | B1 * | 11/2004 | Ishimoto et al. | 701/50 |
| 2002/0188425 | A1 | 12/2002 | Nakagawa et al. | |
| 2003/0001751 | A1 | 1/2003 | Ogura et al. | |
| 2003/0230447 | A1 * | 12/2003 | Wulfert et al. | 180/329 |

* cited by examiner

*Primary Examiner*—Albert W. Paladini
*Assistant Examiner*—Alexander Kosowski
(74) *Attorney, Agent, or Firm*—Finnegan, Henderson, Farabow, Garrett & Dunner LLP

(57) ABSTRACT

An operator interface for a work machine having a machine display system and a mechanical linkage is disclosed. The interface includes an input device having a series of input mechanisms that are adapted to generate a linkage input signal to control the motion of the mechanical linkage and that are adapted to generate a display input signal to input information to the machine display system. A control module is adapted to operate in a linkage control mode, where the motion of the mechanical linkage is controlled, and a display control mode, where the input of information to the machine display system is controlled. A switch may also be associated with the interface. The switch may be adapted to switch the operating mode between the linkage control mode and the display control mode.

23 Claims, 10 Drawing Sheets

OPERATOR INTERFACE FOR A WORK MACHINE

TECHNICAL FIELD

This invention relates to an interface for a work machine. More particularly, this invention relates to an interface including an input device for a work machine.

BACKGROUND

A work machine operator typically interfaces with a work machine using an input device such as, for example, a joystick. The joystick may provide motion along an x-axis and a y-axis. The joystick may also include other input mechanisms, such as, for example, one or more buttons and/or a trigger. The operator may control and orchestrate the motion of a work tool mounted on a linkage on the work machine by manipulating the joystick, the buttons, and/or the trigger. Accordingly, the work machine can perform its functions only when the operator's hands are on the joystick.

Modern work machines include electronic displays that provide information to the operator. These displays often include keys, switches, and/or buttons that allow the operator to set a mode of operation or to enter data into the work machine. To control the display, the operator must remove his hands from the joystick to push the buttons or move the switches on the display. Accordingly, any input of information into the display requires that the operator release the joystick.

One example of a typical display for a work machine is disclosed in U.S. Patent Application Publication No. US 2003/0001751 to Ogura et al. The '751 application discloses a display device and a display controller for construction machinery. The described device includes a display unit, a control unit, and joystick inputs. As shown in FIG. 2 of the '751 application, the joysticks are separate from the display, which includes buttons for inputting data. As described above, such a configuration requires an operator to remove his hands from the joystick to input data, or retrieve data on the display.

This type of work machine display may lead to inefficiencies in a work process. For example, the work process of the operator may be interrupted when the operator removes his hands from the joystick to input or manipulate data on the display screen. Further, the operator's rhythm of operation may be interrupted when the operator removes his hands from the joystick, which may also slow down the work process.

The present invention overcomes one or more of the problems in the prior art.

SUMMARY OF THE INVENTION

In one aspect of the invention, an operator interface for a work machine having a machine display system and a mechanical linkage is disclosed. The interface includes an input device having a series of input mechanisms that are adapted to generate a linkage input signal to control the motion of the mechanical linkage and are further adapted to generate a display input signal to input information to the machine display system. A control module is adapted to operate in a linkage control mode, where the motion of the mechanical linkage is controlled, and a display control mode, where the input of information to the machine display system is controlled. A switch may also be associated with the interface. The switch may be adapted to switch the operating mode between the linkage control mode and the display control mode.

In another aspect of the invention, a method for operating a work machine is disclosed. It includes operating an input device in a linkage control mode, where the motion of a mechanical linkage is controlled, and a display control mode, where an input of information is provided to a display system. The mode of operation of a control module may be switched between the linkage control mode and the display control mode. The input device may then be operated in the other of the linkage control mode and the display control mode.

DETAILED DESCRIPTION

Figure 1:
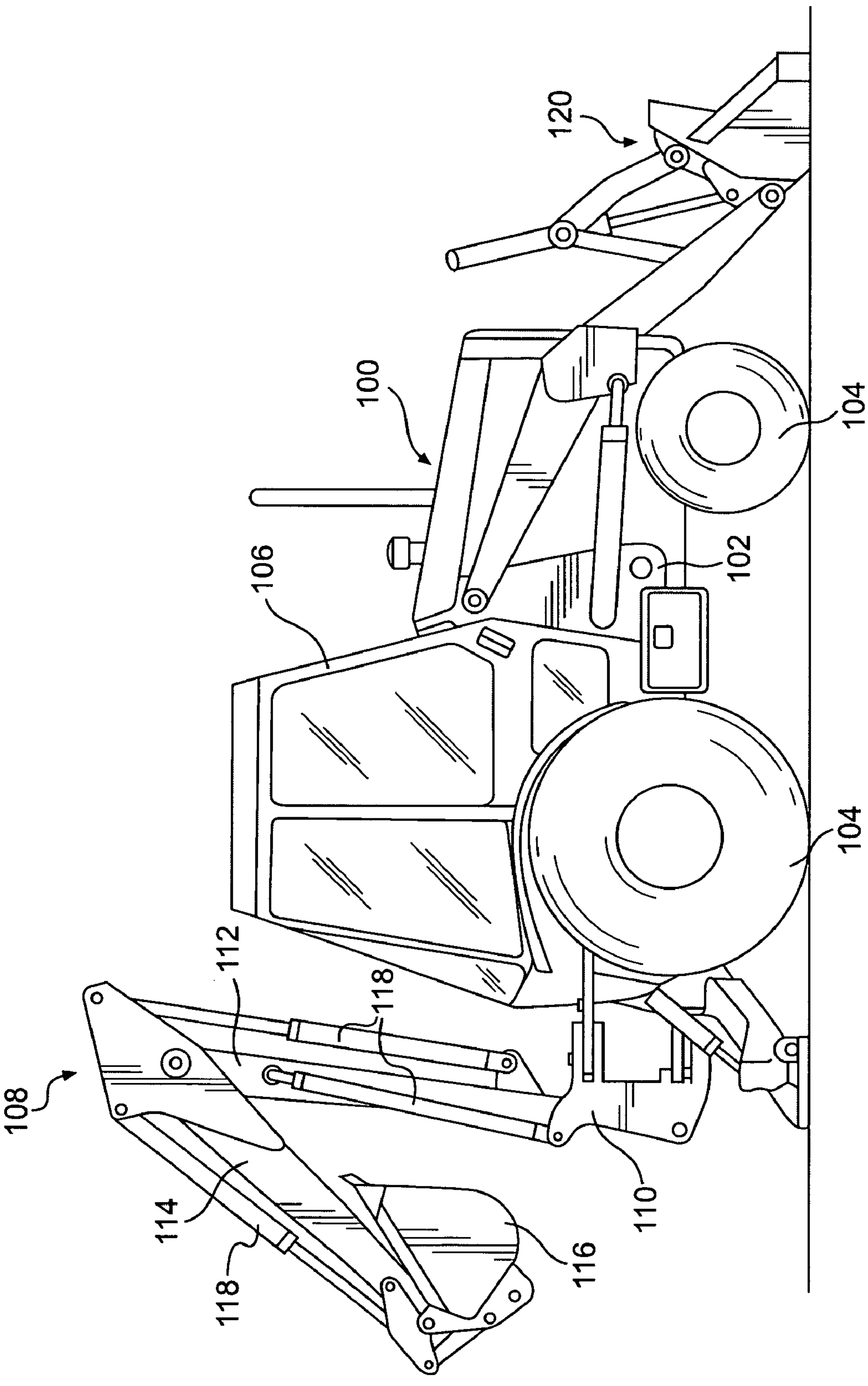
FIG. 1 is a pictorial representation of an exemplary work machine.

FIG. 1 shows an exemplary embodiment of a work machine 100 for performing a variety of work functions. The work machine includes a frame structure 102, an operator's compartment 106, and a mechanical linkage 108. The frame structure 102 is supported by a traction device 104. Traction device 104 may be, for example, wheels, tracks, or belts.

The work machine 100 could be of a type commonly referred to as a backhoe loader and may further include a front work implement assembly 120, such as, for example, a loader bucket assembly. The loader bucket assembly may be connected to the frame structure 102 at the front portion of the work machine 100.

In the exemplary embodiment shown, the mechanical linkage 108 includes a swing frame 110, a boom member 112, a stick member 114, a work implement 116, and actuators 118. The actuators 118 provide movement and control to the mechanical linkage 108 as is known in the art. The actuators 118 may be hydraulic powered cylinders, or may be other types of actuators capable of moving the mechanical linkage 108.

Figure 2A:
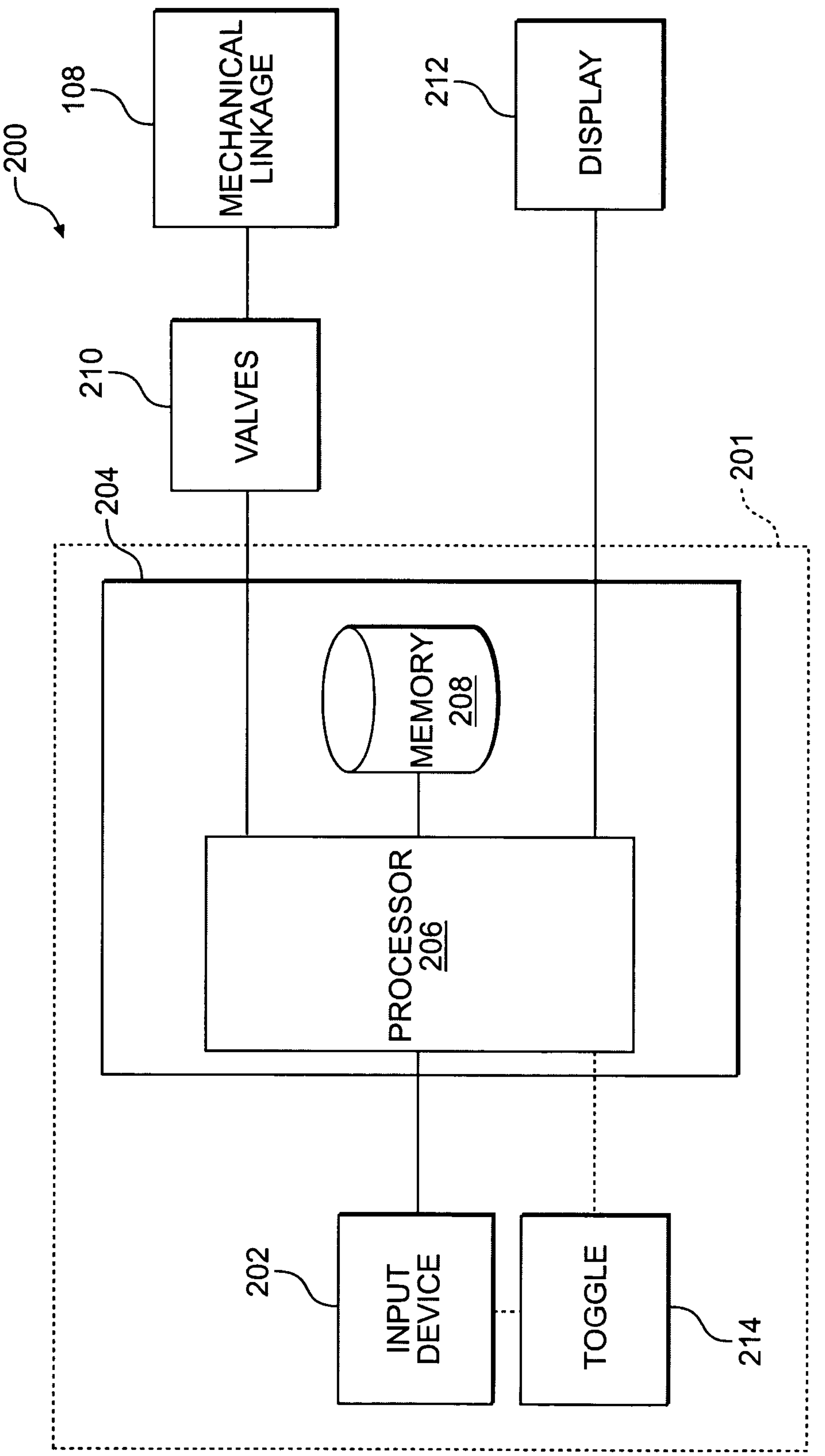
FIG. 2A is a block diagram showing an exemplary control system for a work machine.

FIG. 2A shows a control system 200 including an interface 201 for interfacing with a machine operator and the mechanical linkage 108 of the work machine 100. The interface 201 also interfaces with the machine operator and a machine display 212. The machine display 212 may be housed in the operator's compartment 106 for viewing by the machine operator, and may be any standard screen or other display device adapted to convey information to the operator.

The interface 201 may include an input device 202 and a control module 204. The input device 202 may be housed within the operator's compartment 106 and may be, for example, a joystick. When manipulated by an operator, the input device 202 may generate electronic control signals as instructions that are sent to the control module 204. The control signals for controlling the mechanical linkage 108 may be referred to as linkage input signals and the control signals for controlling the display 212 may be referred to as display input signals.

Figure 3:
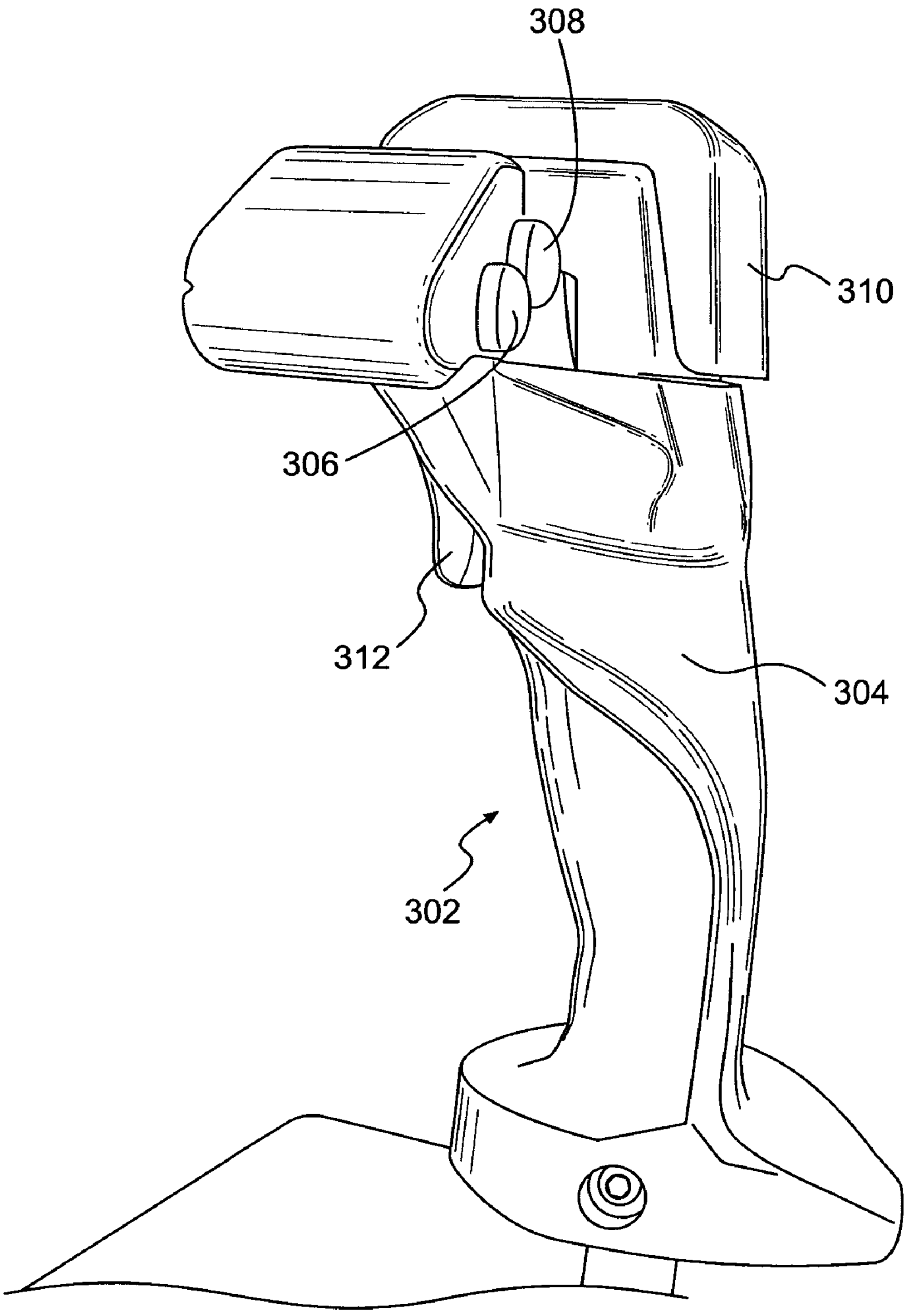
FIG. 3 is a pictorial representation of an exemplary input device.

FIG. 3 shows an exemplary input device as a joystick 302. The joystick 302 includes a hand grip 304. An operator may use the hand grip 304 to grip and hold the joystick 302 and to move the joystick 302 in the x and y directions. The joystick 302 may also include a series of input mechanisms, such as, for example, a select button 306, an option button 308, a slider 310, and a trigger 312. The slider 310 could be a rocker button. In this embodiment, the select button 306, the option button 308, and the slider 310 are all situated on the joystick 302 so that they may be operated by an operator's thumb, while the operator is gripping the hand grip 304. The joystick 302 is exemplary only, and may include more or less input mechanisms than are shown or described.

Returning to FIG. 2A, the control module 204 may include a processor 206 and a memory 208. The processor 206 could be any standard processor for executing a computer program known in the art. Likewise, the memory 208 could be any standard memory component known in the art and may be configured to store data, such as a computer program and/or routine that may be executable by the processor 206.

The control module 204 may be configured to receive the input signals generated by the input device 202 and to generate corresponding control signals that may be sent to valves 210 to control one of the mechanical linkage 108 and the machine display 212. In one exemplary embodiment, the control module 204 controls the mechanical linkage 108 through systems other than valves. In one exemplary embodiment, the control module 204 is adapted to operate in different modes, such as, for example, a linkage control mode where the mechanical linkage 108 is controlled, and a display control mode where the display 212 is controlled. The linkage control mode may allow the operator to input commands through the input device 202 to control the movement of the mechanical linkage 108. Likewise, the display control mode may allow the operator to input signals and commands through the input device 202 to control the machine display 212.

When the control module 204 is used to control the mechanical linkage 108, the control module 204 generates linkage control signals that are based on the operator's manipulation of the input device 202. The linkage control signals result in the opening and closing of the valves 210 to control movement of the actuators 118. In this manner, the movement of the mechanical linkage 108 may be controlled.

The control module 204 is also configured to send display control signals to the display 212. The display control signals may determine what is shown and displayed on the display 212. The display control signals may also be used to show manipulation of the displayed information, such as, for example, moving a cursor, inputting information, and/or selecting displayed functions, icons, or other displayed items. The display 212 and processor 206 operate using known methods, where the information on the screen is controlled by the processor 206, and may be manipulated through the processor 206 using the input device 202. Accordingly, the interface 201 allows an operator to control both the mechanical linkage 108 and the machine display 212 using the same input device 202.

A switch may be associated with the interface 201 to select the operating mode for the control module 204. In one exemplary embodiment, the switch may be a toggle switch 214 that is associated with the input device 202. When the toggle switch 214 is associated with the input device 202, it may be located, for example, on a handle of the input device 202 or, optionally, at the base of the input device 202. In another exemplary embodiment, the toggle switch 214 may be separate from the input device 202, but in communication with the control module 204. Accordingly, the toggle switch 214 may be used independently of the input device 202 to switch between the display control mode and the linkage control mode.

In another exemplary embodiment, the switch for switching between the linkage control mode and the display control mode may be logic that is programmed into the processor 206. In this embodiment, switching between the operating modes may be accomplished by, for example, manipulating a unique combination of input mechanisms of the input device 202 to signal to the processor to switch operating modes. For example, the control module 204 may be adapted so that simultaneously pressing the trigger 312 and the select button 306 changes the working mode from the linkage control mode to the display control mode, or vice-versa. The signal generated by the input device 202 to switch the control module 204 from one mode to another may be referred to as a toggle signal.

Figure 2B:
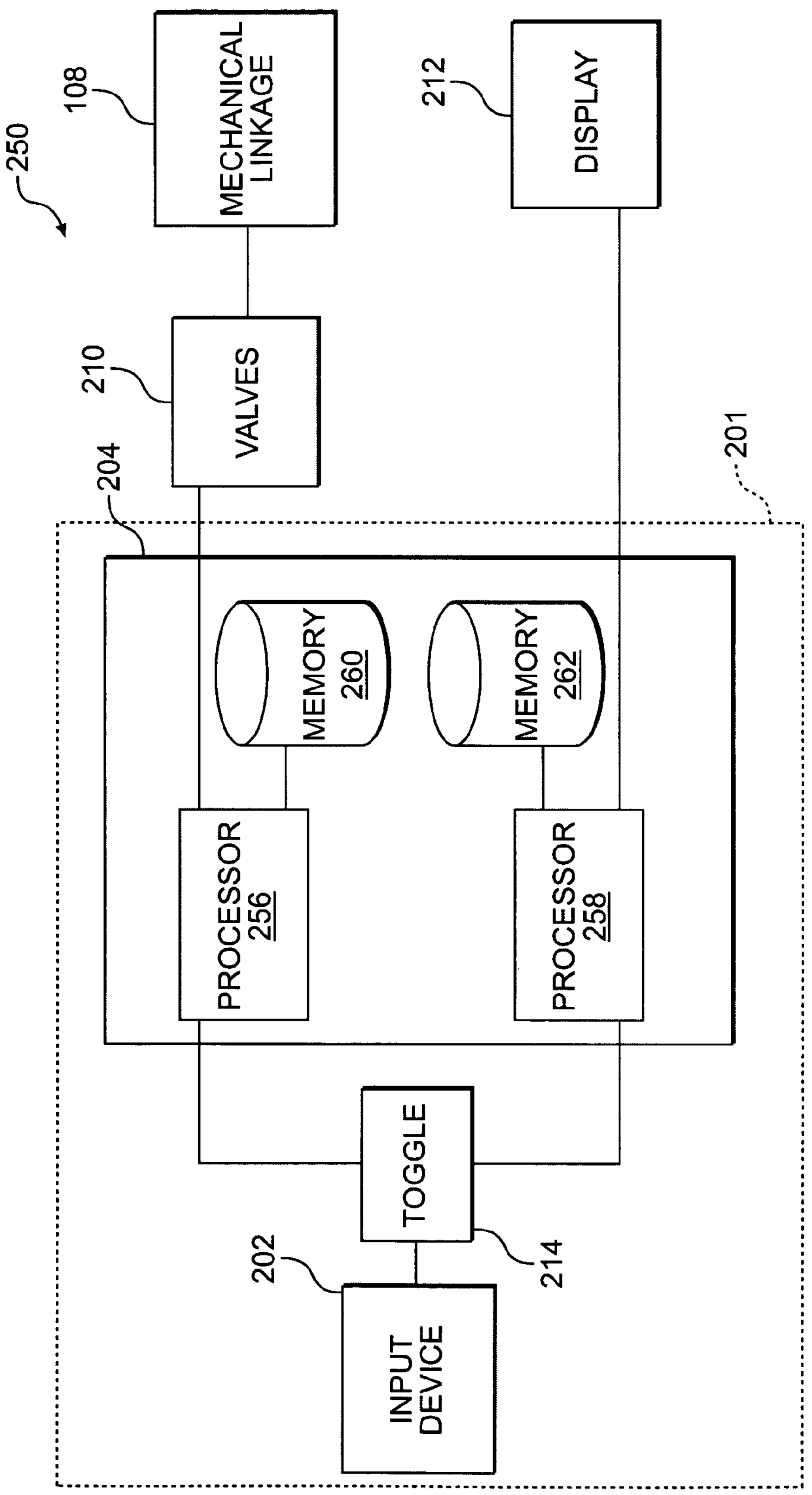
FIG. 2B is a block diagram showing another exemplary control system for a work machine.

FIG. 2B shows another exemplary embodiment of a control system 250. The exemplary control system 250 differs from the exemplary control system 200 described with reference to FIG. 2A in that the interface 201 includes an additional processor and memory. The interface 201 may include a linkage control processor 256 and a display control processor 258. The toggle switch 214 may be located between the input device 202 and the processors 256, 258, and may direct signals from the input device 202 to one or the other of the processors 256, 258. The processors 256, 258 each may be associated with a memory 260, 262, respectively.

It should be understood for purposes of this disclosure and the appended claims that recitation of the term "control module" is not limited to a physical box or structure that may house both the processors 256, 258, but is also intended to include one or more separate processors housed at different locations. Furthermore, the control module 204 may be configured to control any number of separate systems or components associated with the work machine 100.

When the interface 201 is in the linkage control mode, the input mechanisms on joystick 302 may be used in any conventional fashion. For example, the select button 306 may be used to shift a gear up or down and the option button 308 may be used to cycle through steps of an automated linkage control process. The slider 310 may be used to override a feature that is in progress, and the trigger 312 may be used to select a speed range, such as a high or low speed. The x-y motion of the joystick may be used to raise or lower the work implement 116 (referring to FIG. 1). In one embodiment, one of the series of input mechanisms may reset, raise, or lower the mechanical linkage to a preset position, such as a return position. Any of the series of input mechanisms may be assigned to perform any of the functions described, as well as other functions that may be readily apparent to one skilled in the art.

When the interface 201 is in the display control mode, the input mechanisms of the joystick 302 may be used to perform information input, manipulation, or selection functions. For example, x-y motion of the joystick may be used to move a cursor on a display screen. The select button 306 may be used to manipulate displayed information, input information, and/or select selectable functions. As such, an operator may use the select button 306 to select icons or input other information through the display to the control module 204.

When the interface 201 is in the display control mode, the option button 308 may be pressed to communicate to the control module 204 to display menus, options, or other information on the display 212. The slider 310 may be used, in one exemplary embodiment, as a scrolling device to scroll through options or, in another exemplary embodiment, to move the cursor across the machine display 212. Likewise, the trigger 312 may be used as a selection device to select an icon or menu that may be highlighted or selected. Other functions or alternative functions could be assigned to each of the input mechanisms. The description and assignments of functions for each of the input mechanisms is exemplary only.

When the interface is operating in the display control mode, the input device 202 may be manipulated in several different ways to control the input, selection, and manipulation of data. FIGS. 4–8 illustrate several different exemplary manners of using input device 202. It is contemplated that other manners of using input device 202 to control the input, selection, and manipulation of data may be readily apparent to one skilled in the art.

Figure 4:
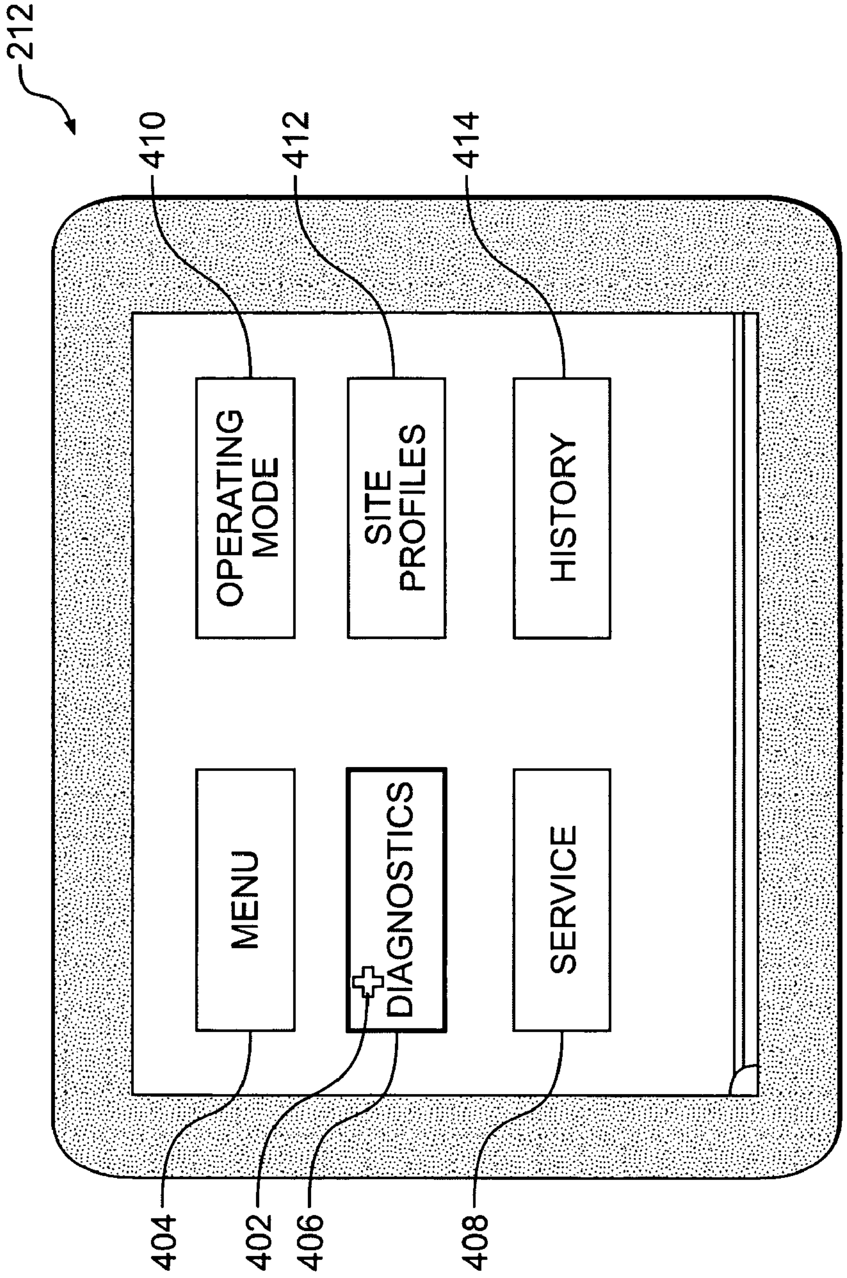
FIG. 4 is a pictorial representation of an exemplary machine display screen.

FIG. 4 shows an exemplary machine display 212 that may be used on the work machine 100. In this exemplary embodiment, the information displayed on the display 212 includes a cursor 402 that may be moved about the machine display 212. In one exemplary embodiment, the movement of the cursor 402 may be controlled by the x-y movements of the input device 202. Accordingly, the cursor 402 may be used to move over selectable icons or images. In this embodiment, the machine display 212 includes a menu icon 404, a diagnostics icon 406, a service icon 408, an operating mode icon 410, a site profiles icon 412, and a history icon 414. Selection of any of the icons 404–414 changes the information displayed on the machine display 212 to include information relating to the subject within that icon, as is known in the art.

In this exemplary embodiment of the machine display 212, movement of the cursor 402 over an icon, such as the diagnostics icon 406, causes the corresponding icon to be highlighted. This icon may then be selected merely by pressing a button on the input device 202, such as, for example, pressing the select button 306 or the trigger 312 on the joystick 302. In so doing, the operator is able to select an icon on the machine display 212, through the control module 204, without removing his or her hands from the input device 202.

Selecting the diagnostics icon 406 may instruct the control module 204 to display new information on the machine display 212, showing, for example, data on the work machine, such as, for example, temperature of components of the work machine, wear of the work machine, or loads applied to the work machine. Any of the exemplary icons 404–414 may be selected as selectable functions to instruct the control module 204 to display new information on the machine display 212.

Figure 5:
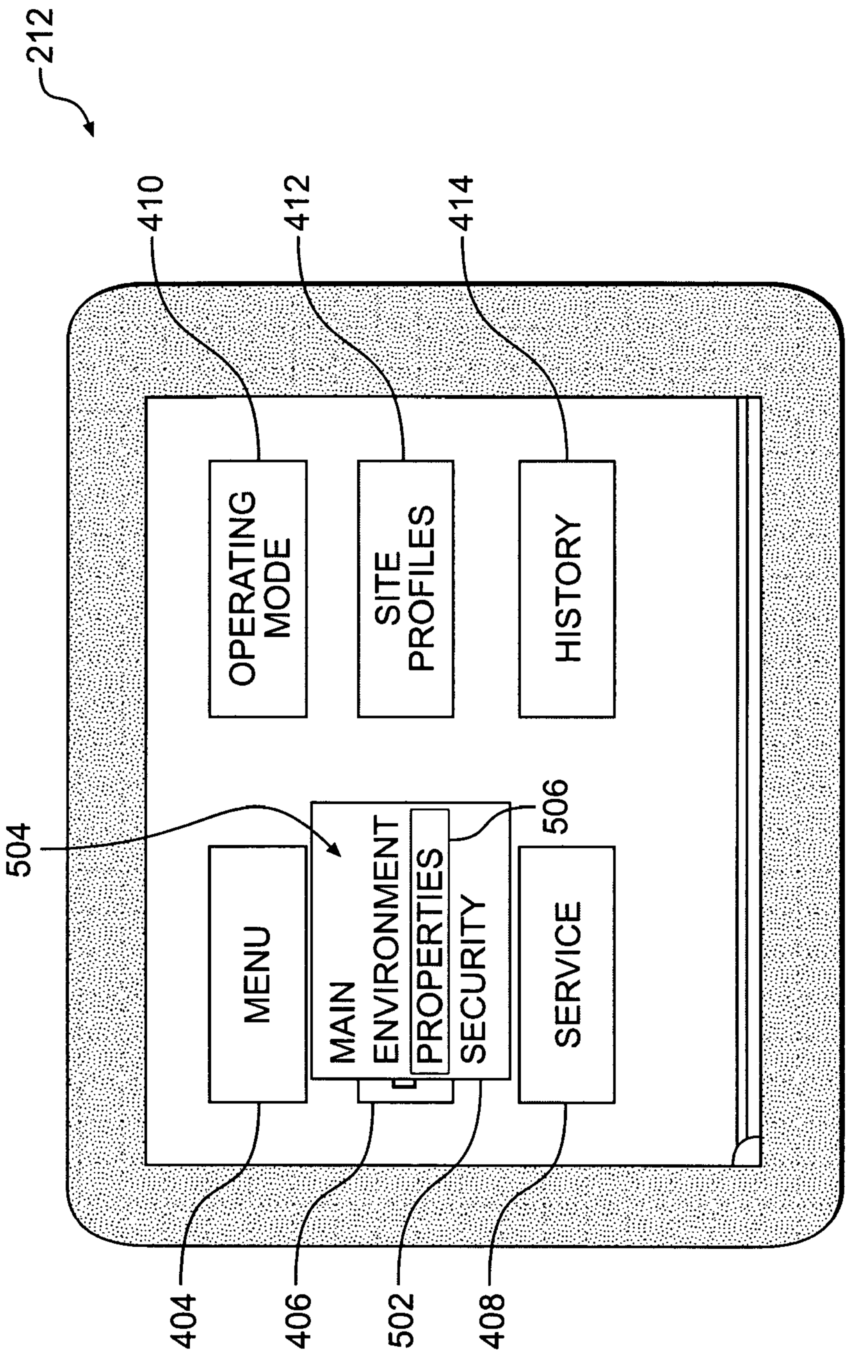
FIG. 5 is another pictorial representation of an exemplary machine display screen.

FIG. 5 shows the machine display 212 with a pop-up menu 502. In one exemplary embodiment, the control module 204 displays the pop-up menu 502 on the machine display 212 when an input mechanism on the input device 202 is selected, such as, for example, pressing the option button 308 on the joystick 302. The exemplary pop-up menu 502 has menu options 504 such as, for example, main, environment, properties, and security. Each of the menu options 504 may be selected to instruct the control module 204 to display new or different information on the machine display 212. In one exemplary embodiment, a menu cursor 506 may be displayed on the display 212, and may be controlled through the control module 204 by the input device 202 to highlight and select one of the menu options 504. In the embodiment shown, the menu cursor 506 is highlighting the "properties" icon of the menu options 504. Accordingly, pressing an input mechanism associated with the input device 202, such as, for example, the select button 306 on the joystick 302, will select the "properties" icon, thereby inputting information as a selection of an icon.

Figure 6:
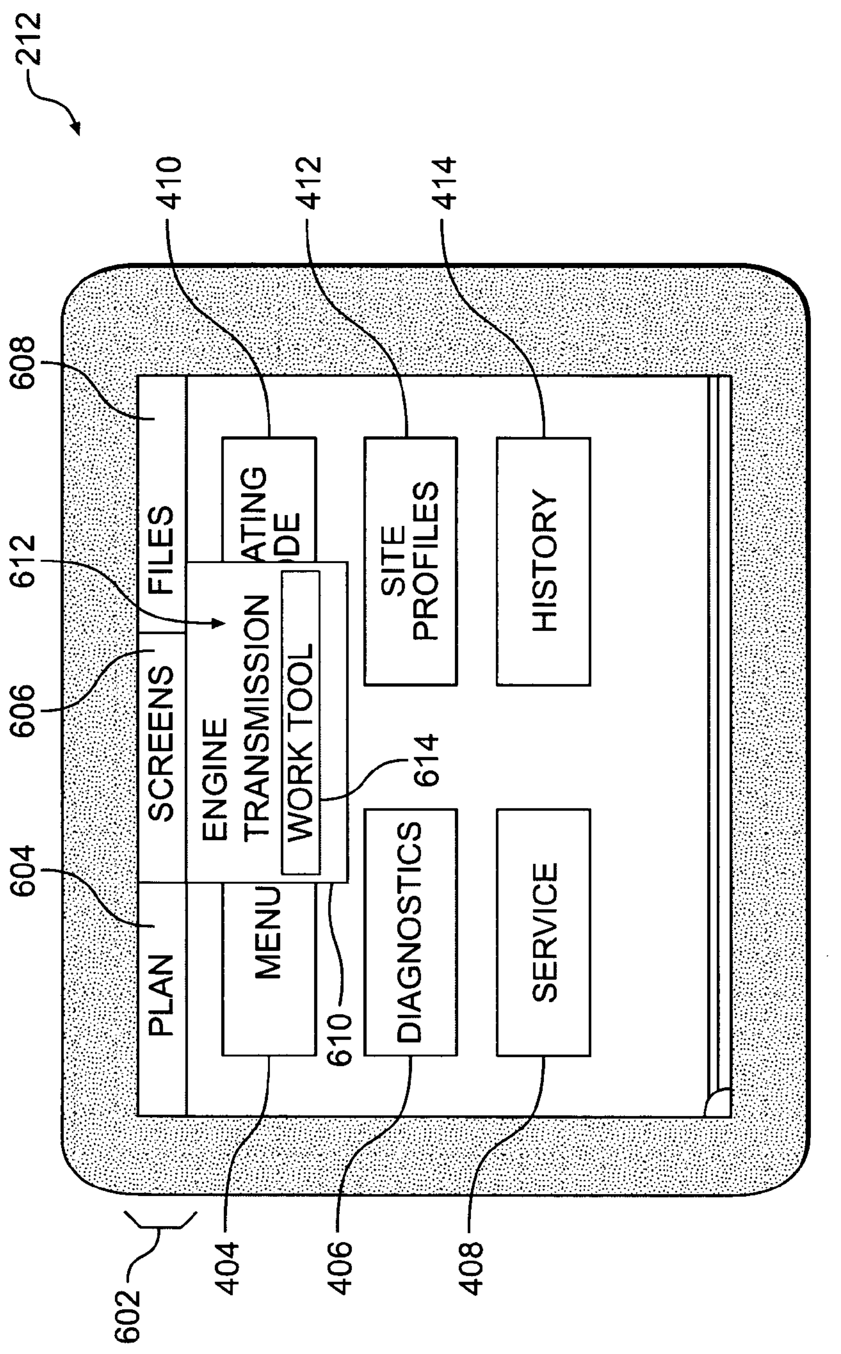
FIG. 6 is another pictorial representation of an exemplary machine display screen.

FIG. 6 shows the machine display 212 with a menu bar 602 extending across its top portion. The menu bar 602 may include selectable icons, such as menu headings, that may, for example, include a plan heading 604, a screens heading 606, and a files heading 608. In this exemplary embodiment, a pull-down menu 610 may be displayed on the screen below the menu bar 602 when one of the headings 604, 606, 608 on the menu bar 602 is selected. In the embodiment shown, the screens heading 606 was selected, signaling to the control module 204 to display the pull-down menu 610 associated with the screens heading 606.

The pull-down menu 610 may include a display of menu options 612. In the embodiment shown, the menu options 612 include an engine selection, a transmission selection, and a work tool selection. A menu cursor 614, controlled by the input device 202, may be used to highlight any of the menu options 612 on the pull-down menu 610. The menu cursor 614 may be controlled by the input device 202, such as through the x-y movement of the joystick 302, or alternatively, by any one of the input mechanisms, such as, for example, the slider 310. In the embodiment shown, the work tool menu option is highlighted. Accordingly, an input mechanism associated with the input device 202 may be used to select the work tool option, thereby inputting information as a selection of an icon or selectable function.

Figure 7:
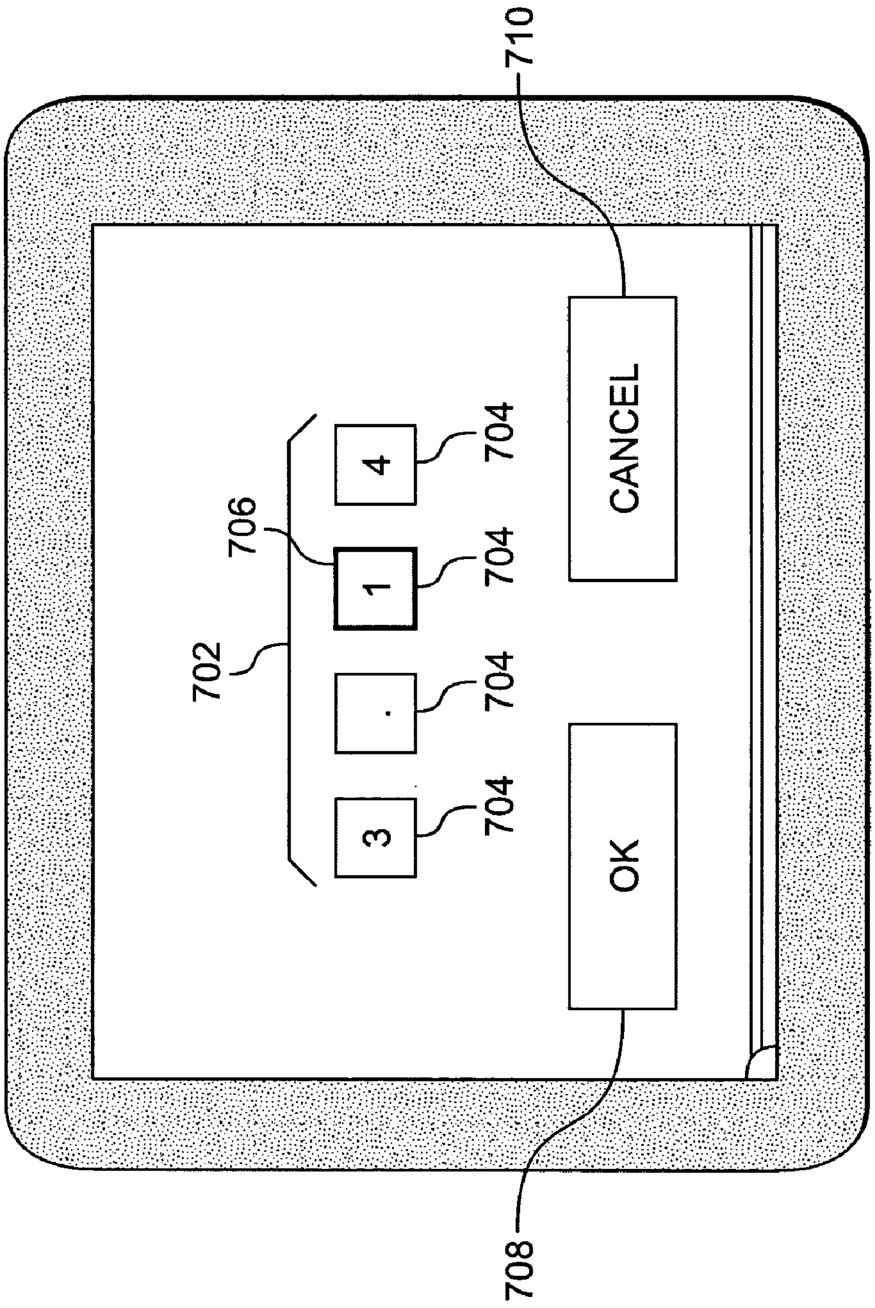
FIG. 7 is another pictorial representation of an exemplary machine display screen.
Figure 8:
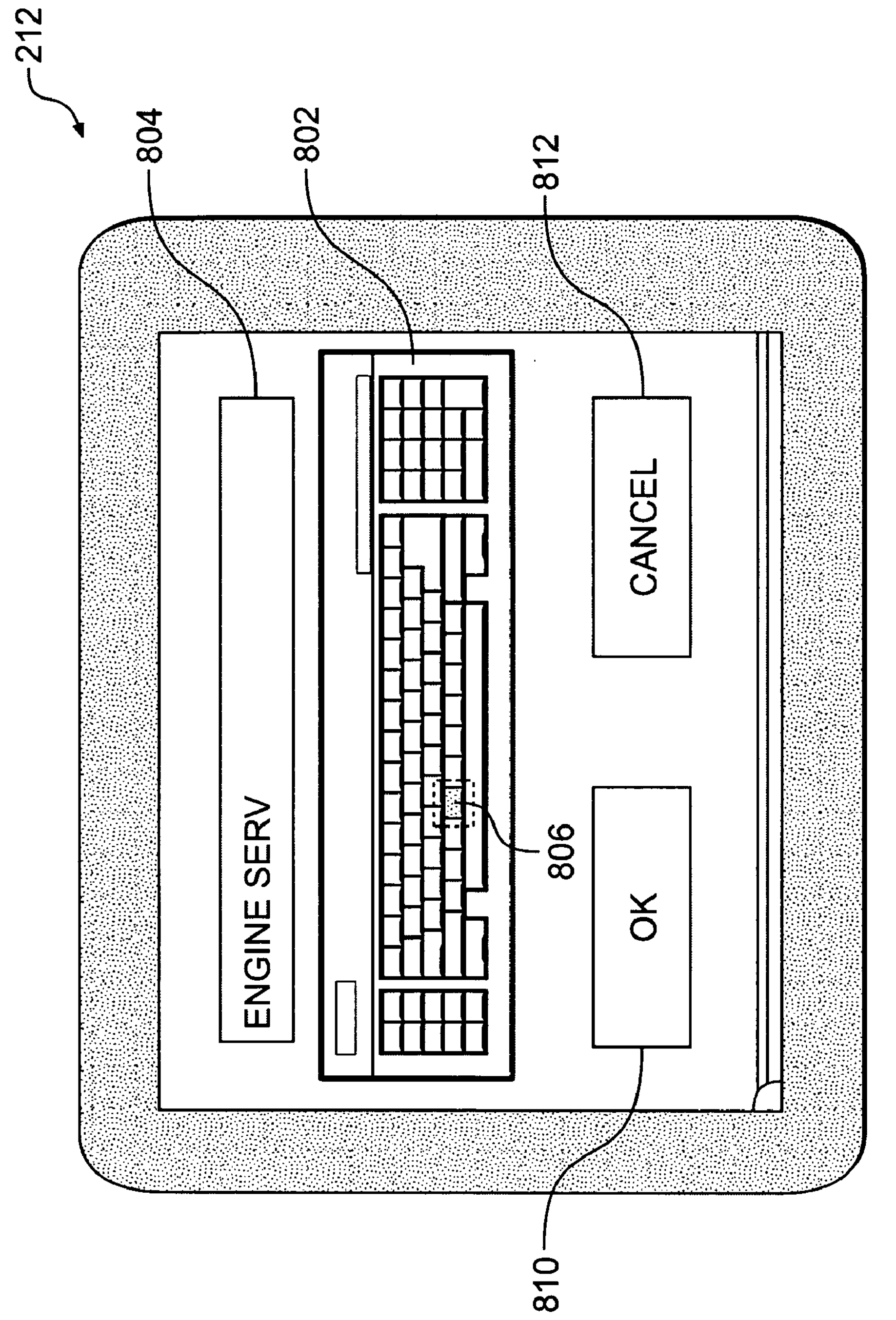
FIG. 8 is another pictorial representation of an exemplary machine display screen.

FIGS. 7 and 8 show exemplary machine displays 212 for inputting information into the control module 204 using the display 212 and the input device 202. In this exemplary embodiment of FIG. 7, a numerical value 702 is shown on the display 212 having a value of 3.14. The numerical value 702 includes digit squares 704 and a cursor 706 adapted to highlight one or more of the digit squares 704 at a time. The cursor 706 may be controlled to move across the display 212 to select any of the digit squares 704 using the input device 202, as desired. In the exemplary embodiment shown, the cursor 706 is selecting, and highlighting, a single digit square 704 containing the digit "1." When a digit square 704 is selected, the digit displayed within the digit square 704 may be increased or decreased through a scrolling operation using any of the input mechanisms associated with the input device 202, including, for example, those associated with the joystick 302 such as, the x-y control, the select button 306, the option button 308, the slider 310, or the trigger 312.

In one embodiment, the slider 310 may be used to scroll the digits in each digit square 704. Accordingly, in this embodiment, an operator selects to highlight the digit square 704 using the input device 202, and then scrolls through the digits 0–9, including a decimal, using the slider 310. When the desired number is displayed, the number may be input using the select button 306, option button 308, or trigger 312. However, other methods could be used as would be apparent to one skilled in the art, including moving the cursor 706 off the digit square using the x-y movement of the joystick 302. Further, in yet another exemplary embodiment, the x-y movement of the joystick 302 may be used to scroll through the digits once the digit square 704 has been selected. In another exemplary embodiment, the control module 204 automatically selects the next digit square 704 when the previous digit square is inputted.

An OK icon 708 and a cancel icon 710 may also be included on the machine display 212. These icons may be selected by moving the cursor 706 to the icon using the input device 202. When the cursor 706 is displayed on one of the icons 708, 710, the desired icon may be selected using, for example, the select button 306. Although the machine display 212 is shown as a screen for inputting a numerical value, it could also be used to input alphanumeric characters.

FIG. 8 shows another exemplary machine display 212 for inputting alphanumeric characters using the input device 202. In this exemplary embodiment, the machine display 212 shows keys and buttons on an image 802 of a standard keyboard. The keys of the image 802 may be icons that may be selected or highlighted using a cursor 806. The cursor 806 may be controlled by the input device 202, such as through the x-y movement of the joystick 302 and the selection of the highlighted icon may be accomplished with an input mechanism, such as, for example, pressing the selection button 306 as described earlier.

A text line 804 may extend across an upper portion of the display 212. The text line 804 shows the selected icon so that an operator may easily observe the input of text. For example, to select a "V", the operator may place cursor 806 above the "V" typing key. The selection button 306 may be pressed, signaling the control module 204 to display a "V" on the text line 804. As described with reference to FIG. 7, the machine display 212 of FIG. 8 may also includes an OK icon 810 and a cancel icon 812 that may be selected by moving the cursor 806 over the icon and operating an input mechanism, such as the select button 306. As would be apparent to one skilled in the art, the text line 802 may also be used to input numerical characters and other information.

INDUSTRIAL APPLICABILITY

Figure 9:
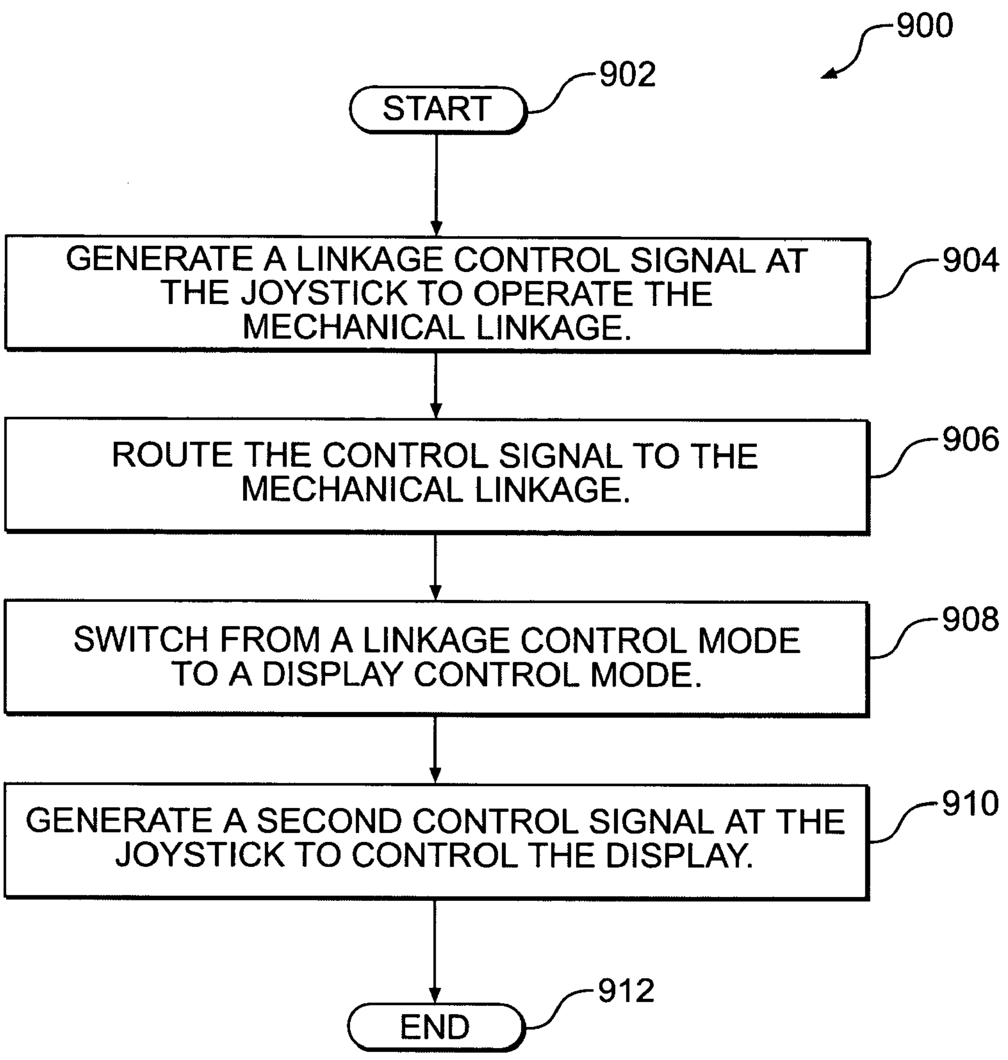
FIG. 9 is a flow chart illustrating an exemplary method of controlling a work machine.

FIG. 9 shows a flow chart 900 for controlling the work machine 100 using the interface 201. At a start step 902, the work machine is powered on. At a step 904, a linkage control signal is generated at the input device 202, such as the joystick 302, to operate the mechanical linkage 108. To do this, the operator inputs a linkage input signal using the joystick 202, which is processed by the control module 204. At a step 906, a linkage control signal is routed by the control module 204 to the valves 210 for controlling the actuators 118 on the mechanical linkage 108. The actuators 118 may be controlled to move the mechanical linkage 108 in the manner requested by the operator. The operator may continue to move the mechanical linkage in this manner until the operator desires to input, select, or manipulate data in display system 212.

At a step 908, the operator instructs the control module 204 to switch from a linkage control mode to a display control mode. This may be accomplished using, for example, a pre-established, unique combination of button and/or trigger inputs, which sends a toggle signal from the input device 202 to the control module 204. The control module 204 may receive the toggle signal from the input device 202, and apply logic preprogrammed in the control module 204 to switch from the linkage control mode to the display control mode. Alternatively, a toggle switch 214 may be thrown, switching the control module 204 from the linkage control mode to the display control mode. In another alternative, the toggle switch 214 may be thrown to switch the operating mode of the control module 204 by directing the input signals from the input device 202 to a display control processor instead of a linkage control processor.

At a step 910, an operator generates a display input signal at the input device 202 to input, select, or manipulate data as described in connection with FIGS. 4–8. For example, the operator may move the joystick 302 through an x-y motion to control a cursor on the machine display 212. The cursor on the machine display 212 may be used to input information and to select selectable functions, including, for example, pop-up menus, pull down menus, scrolling through available options, and inputting text and numerical values into the system. When the operator has finished entering, selecting, or manipulating data, the operator may switch the operating mode of the control module 204 back to the linkage control mode so that movement of the mechanical linkage may be again controlled.

While the exemplary embodiment is shown as a backhoe loader, other types of work machines may utilize the disclosed system, including tractors, loaders, dozers, telehandlers, compactors, excavators, shovels, scrapers, material handlers, graders, skidders, combines, off highway tractors and trucks, planers and soil stabilizers, planers, and paving equipment, and others.

The described interface increases operator efficiency by reducing interruptions to the operator because he or she is no longer required to remove their hands from the input device to input or manipulate data on a display screen. Furthermore, the interface enables the display screen to be provided on the work machine without the typical input devices, such as knobs, buttons, or dials. This lowers the cost of the display screen to the manufacturer. Other advantages would be apparent to one skilled in the art.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. An operator interface for a work machine having a machine display system and a mechanical linkage, comprising:

an input device having a series of input mechanisms adapted to generate a linkage input signal to control the motion of the mechanical linkage and adapted to generate a display input signal to input information to the machine display system;

a control module adapted to operate in one of a linkage control mode where the motion of the mechanical linkage is controlled and a display control mode where the input of information to the machine display system is controlled; and a switch associated with the interface, the switch being adapted to switch the operating mode between the linkage control mode and the display control mode.

2. The interface of claim 1, wherein the switch is a toggle switch adapted to switch the operating mode of the control module between the linkage control mode and the display control mode.

3. The interface of claim 1, wherein the switch includes logic in the control module, adapted to switch the operating mode between the linkage control mode and the display control mode in response to a toggle signal.

4. The interface of claim 3, wherein the toggle signal is a predetermined manipulation of the input device.

5. The interface of claim 1, wherein control module is adapted to control at least one of a manipulation of information, a movement of a cursor, an input of information, and a selection of selectable functions based on the display input signal when the control module is operating in the display control mode.

6. The interface of claim 5, wherein the selectable functions include at least one of a selection of an operating mode, a selection of machine diagnostics, and a selection of a machine maintenance schedule.

7. The interface of claim 5, wherein the input of information includes at least one of an input of alpha characters, an input of numerical characters, and a selection of an icon.

8. The interface of claim 5, wherein the control module is adapted to control the input of information by at least one of a pop-up menu, a drop-down menu, a scrollable selection, and a selectable icon.

9. The interface of claim 1, wherein the control module is adapted to control the position of at least one of a plurality of hydraulic valves associated with the mechanical linkage in response to the linkage input signal when the control module is operating in the linkage control mode.

10. The interface of claim 1, wherein the input mechanisms of the input device include at least one of a trigger, a plurality of buttons, and a slider.

11. The interface of claim 1, wherein the control module includes:

a first processor adapted to operate in the linkage control mode; and a second processor adapted to operate in the display control mode.

12. A method for operating a work machine comprising:

operating an input device in one of a linkage control mode where the motion of a mechanical linkage is controlled and a display control mode where an input of information is provided to a display system;

switching the mode of operation of a control module between the linkage control mode and the display control mode; and operating the input device in the other of the linkage control mode and the display control mode.

13. The method of claim 12, wherein switching the mode of operation includes switching a physical switch.

14. The method of claim 12, wherein switching the mode of operation includes generating a toggle signal.

15. The method of claim 14, wherein generating the toggle signal includes performing a predetermined manipulation of the input device.

16. The method of claim 12, further including manipulating the input device to control the motion of a mechanical linkage when the input device is operating in the linkage control mode.

17. The method of claim 12, further including manipulating the input device to input information to the display system when the input device is operating in the display control mode.

18. A work machine comprising:

a mechanical linkage having a work implement;

a machine display system associated with the work machine for receiving and displaying information;

an input device having a series of input mechanisms adapted to generate a linkage input signal to control the motion of the mechanical linkage and a display input signal to input information to the machine display system;

a control module adapted to operate in one of a linkage control mode where the motion of the mechanical linkage is controlled and a display control mode where the input of information to the machine display system is controlled; and a switch associated with the interface, the switch being adapted to switch the operating mode between the linkage control mode and the display control mode.

19. The work machine of claim 18, wherein the switch is a toggle switch adapted to switch the control module between the linkage control mode and the display control mode.

20. The work machine of claim 18, wherein the switch includes logic in the control module, adapted to switch the operating mode between the linkage control mode and the display control mode in response to toggle signal.

21. The work machine of claim 18, wherein the control module is adapted to control functions on the machine display system including at least one of a movement of a cursor, an input of information, and a selection of selectable functions.

22. The work machine of claim 18, wherein the control module includes:

a first processor adapted to operate in the linkage control mode; and a second processor adapted to operate in the display control mode.

23. An operator interface for a work machine for controlling a machine display and a mechanical linkage, comprising:

an input means for controlling the motion of the mechanical linkage and for controlling an input of information to the machine display;

a control means for operating in one of a linkage control mode where the motion of the mechanical linkage is controlled and a display control mode where the input of information to the machine display is controlled; and a switching means for switching the operating mode between the linkage control mode and the display control mode.

* * * * *